Figure 1:
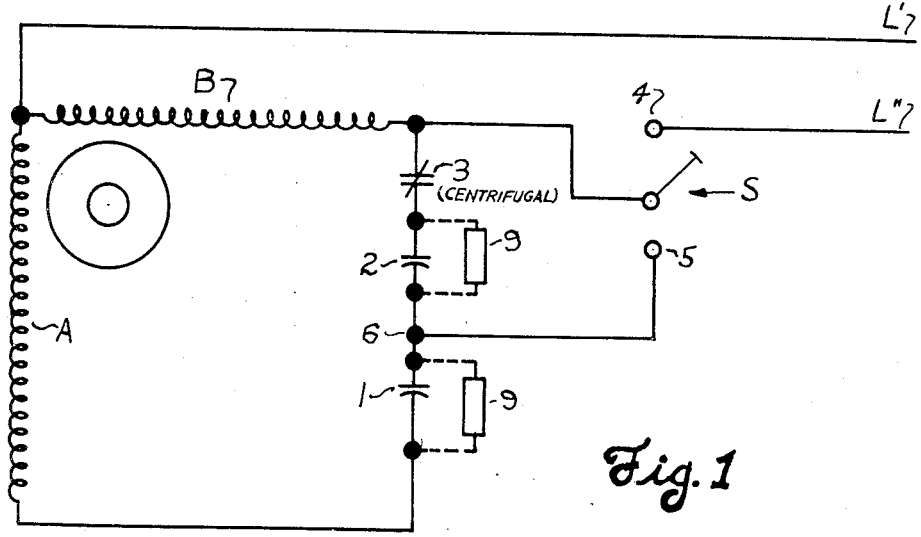

June 17, 1958

W. R. APPLEMAN 2,839,712

ELECTRIC MOTOR

Filed Sept. 15, 1955

INVENTOR.
WILBUR R. APPLEMAN
BY Tom Walker

United States Patent Office 2,839,712
Patented June 17, 1958

2,839,712

ELECTRIC MOTOR

Wilbur R. Appleman, Dayton, Ohio, assignor, by mesne assignments, to The Reliance Electric and Engineering Company, Cleveland, Ohio, a corporation of Ohio Application September 15, 1955, Serial No. 534,420

8 Claims. (Cl. 318—211)

This invention relates to a new and improved electric motor providing novel capacitor braking means incorporated therein as a part of the control circuit.

It has been well known for a considerable time that a capacitor-start, induction-run, motor possesses inherent dynamic braking characteristics when the source of power is removed from the motor. However, the amount of capacitance available in such motors is generally inadequate to provide effective braking action on the motor since the capacitance required for optimum and effective braking is usually greatly in excess of the amount required for maximum starting torque for the motor.

In the prior art, principles of capacitor braking have been employed to some extent. As employed, however, they have not efficiently provided the necessary capacitance nor immediate braking, because of the usually employed centrifugal switch. As a result, braking efficiency is low. In the prior art the usual treatment of the problem of capacitor braking involves merely a single condenser unit in the braking circuit which is not effective until the centrifugal switch re-closes. This leaves much to be desired in the way of efficient braking action.

The present invention presents a definite advance in the art of capacitor braking of electric motors. It provides an improved capacitor starting circuit in a motor wherein condensers are arranged in series for proper starting torque. It further includes means connected in the motor circuit, effective on cutting of power to the motor, to increase the capacitance provided by the same condensers to the degree necessary for immediate braking of the motor.

The object of the invention is to simplify the construction as well as the means and mode of operation of electric motors, whereby such motors may not only be economically manufactured, but will be more efficient and satisfactory in use, adaptable to a wide variety of applications, and be unlikely to get out of repair.

A further object of the invention is to provide a new and improved electric motor providing novel capacitor braking means in the control circuit thereof.

Another object of the invention is to provide an improved motor control circuit for induction motors wherein condensers are connected in one orientation to provide an appropriate starting capacity for the motor and automatically reoriented on cutting of power to the motor to provide a braking circuit having the excess capacity necessary for immediate braking action on the motor.

An additional object of the invention is to provide an improved electric motor employing condensers in series in the motor starting circuit for capacitor starting and means in the control circuit thereof to by-pass at least one of said condensers and provide a braking circuit having a higher capacity than the starting circuit whereby immediate braking of the motor obtains.

A further object of the invention is to provide an improved electric motor employing condensers in series in the motor control circuit to provide the appropriate capacity for proper starting torque and means effective, on cutting of power to the motor, to reconnect the condensers in parallel in a braking circuit whereby immediate positive braking of the motor is obtained.

A further object of the invention is to provide an electric motor possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 2:
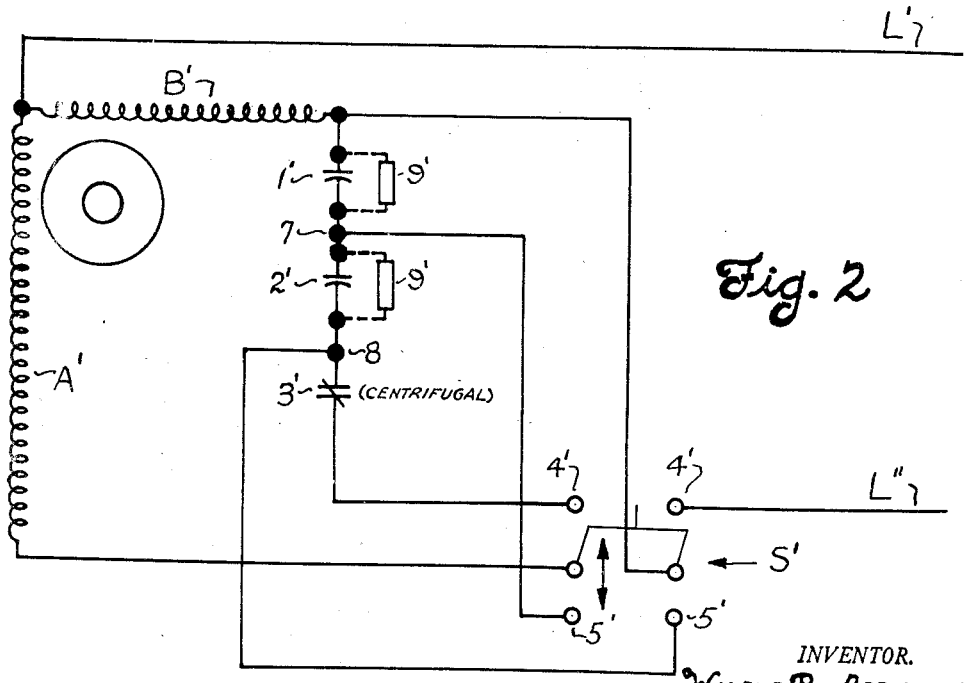

Referring to the accompanying drawing wherein is shown one but obviously not necessarily the only form of embodiment of the invention, Fig. 1 shows a schematic of a motor control circuit embodying the subject invention, and Fig. 2 shows a schematic of a motor control circuit embodying another form of the subject invention.

Like parts are indicated by similar characters of reference throughout the several views.

The invention can best be described with reference to the drawings. In Fig. 1 is shown a motor control circuit for an induction motor requiring a relatively high starting torque. As shown, one side of the main line L' is connected to the phase winding A and the main winding B. Connected in series with the phase winding across the main winding are condensers 1 and 2 and a centrifugal switch 3. The switch 3 is always closed when the motor is at rest. A single-pole double throw switch S is connected to the main winding B and has a running contact 4 which connects the main winding B to the other side L" of the main line when closed and a braking contact 5 which connects into the starting circuit at 6 to by-pass condenser 2 and switch 3 and provide a braking circuit for the motor thereby. Thus, the switch S is the control for selectively initiating the running or braking of the motor.

To start the motor, contact 4 is made by the switch S. This provides power to the starting circuit through the main line. The starting circuit is provided by the phase winding A connected in series through condensers 1 and 2 and the centrifugal switch 3, which is closed, across the main winding B. The condensers in series provide the necessary capacity for starting the motor. When proper motor speed is attained, the centrifugal switch 3 opens to cut the starting circuit and the main winding alone remains across the main line as the motor operates.

When it is desired to stop the motor, switch S is moved from contact 4 to contact 5, thereby disconnecting the motor from its power source. This provides a circuit which by-passes the open switch 3 and condenser 2. This circuit is the capacitor braking circuit and as contact 5 is made, the circuit is completed from the main winding B through contact 5, condenser 1, and phase winding A across the main winding. The single condenser 1 provides a sufficient and correct capacity for immediate braking of the motor.

Thus, a motor control circuit is provided which affords a proper amount of capacity for starting the motor. Utilizing the same condensers as used in the starting circuit, the invention provides the proper capacity necessary in effecting a braking circuit for immediate braking of the motor on demand. This particular circuit (Fig. 1) is preferable when the motor requires a high starting torque. The condenser capacity needed for braking is in excess of that needed, or desired for starting, so one condenser is by-passed when the braking circuit is established. Since excess capacity of the condensers produces a decreased braking torque, the condensers are not reconnected in parallel.

In Fig. 2 of the drawings can be seen a modified control circuit recommended where lower condenser capacity is used because high starting torque is not required. As shown, one side L' of the power line is connected to the phase winding A' and the main winding B' of the motor. A two-pole double throw switch S' is provided having running contacts 4' and braking contacts 5'. On making running contacts 4', a starting circuit for the motor is completed, the phase winding A' being connected to centrifugal switch 3' and condensers 1' and 2' in series across the main winding B'. The switch 3', of course, is closed when the motor is at rest. Thus, the condensers provide the proper capacity for starting of the motor. On making of the braking contacts 5', the switch S' makes connections 7 and 8 across the condensers and throws them in parallel across the main winding with the phase winding A'. This causes an increase in capacity of the original condensers as used for starting and effects a braking circuit which is immediately effective to brake the motor.

The sooner the braking circuit is completed after the power is removed, the more effective the braking will be. A motor incorporating a centrifugal switch, if permitted to slow down gradually to a point where the centrifugal switch completes the braking circuit, will have very little braking torque. As will be seen, the present disclosure provides means for by-passing the centrifugal switch 3—3', so that the greatest possible braking torque is applied substantially simultaneously with removal of power from the motor.

For some applications discharge resistors 9—9' across the capacitors 1—2 and 1'—2' are advantageously used as shown, such resistors may be incorporated in the present circuit without difficulty and without affecting operation thereof.

Thus, as can be seen from embodiments of the invention presented here, an improved motor control circuit is provided that utilizes condensers in series for capacitor starting. This is effected so that the capacity in the system is kept at a proper value necessary for efficient starting. Then means are provided in the improved control circuit to reorient the same condensers in effecting a braking circuit whereby the capacity provided by the condensers is substantially altered to provide effective and immediate braking of the motor on cutting of power thereof. The invention provides an exceedingly simple and effective capacitor braking system of a highly improved and efficient nature. It is applicable to reversible motors as well as non-reversible motors as shown.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statue the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A control circuit for an electric motor comprising, a main motor winding, a phase winding, a power line having one side thereof connected to said windings, condensers, a centrifugal switch, said condensers and said centrifugal switch being connected in series and with said phase winding across said main winding forming a start circuit having a predetermined capacity, and switch control means connected to said main winding and selectively operable to engage the other side of said power line for operation of the motor or to engage in said starting circuit to reorient said condensers and connect them and the phase winding to staid main winding to form a braking circuit with an increased capacity relative said starting circuit whereby immediate effective braking of the motor is obtained.

2. A control circuit for electric motors comprising, a main motor winding, a phase winding, a power line having one side thereof connected to said windings, condensers in series, a switch, said switch being normally closed when the motor is at rest, said condensers and said switch being respectively connected in series and with said phase winding across the main winding to provide a motor starting circuit, said switch automatically opening the starting circuit on the motor obtaining a predetermined speed, and control means for normally connecting said main winding with the other side of said power line for operation of the motor and operable to cut power to the motor and to engage in said starting circuit to by-pass said open switch and at least one of said condensers and connect the other of said condensers and said phase winding across said main winding to immediately brake the motor on cutting of power thereto.

3. A control circuit for an electric motor having capacitor braking, comprising a main motor winding, a phase winding, a power line having one side thereof connected to said windings, a pair of condensers, a centrifugal switch, normally closed when the motor is at rest, said condensers and said switch being respectively connected in series to said phase winding across said main winding to form a starting circuit having a predetermined capacity, contact means connected in the other side of said power line, a second contact means connected in said starting circuit intermediate said pair of condensers, and control means connected to said main winding and operable to selectively engage said power line contact means for operation of the motor or to engage said second contact means, by-pass said switch, and effect a braking circuit wherein said condensers are reoriented to alter the capacity thereof whereby immediately effective braking of the motor is obtained on engagement of said control means to said second contact means.

4. A control circuit for an electric motor having capacity braking, comprising, a main motor winding, a phase winding, a power line having one side thereof connected to said main winding and said phase winding, a pair of condensers, a switch normally closed when the motor is at rest, said condensers and said switch being connected in series to said phase winding across said main winding to provide a starting circuit thereby having a predetermined capacity, first contact means connected to said power line on the other side thereof, second contact means connected in said starting circuit across said condensers, and control means connected to said main winding and operable to selectively engage said first contact means for operation of said motor, or to engage said second contact means to place said condensers in parallel across said main winding thereby effecting a dynamic braking circuit of increased capacity whereby immediate effective braking of the motor is obtained.

5. A motor control circuit for electric motors comprising, a pair of power supply lines, a main winding, a phase winding, said windings commonly connecting to one of said power lines, capacitor means connecting in series with said phase winding and across said main winding forming a starting circuit having a specific capacitance available to provide starting torque for the motor, and means connected to said main winding and selectively connectable to said other power supply line for operation of the motor or with a portion of said capacitor means and said phase winding across said main winding so as to form a dynamic braking circuit having greater capacitance than provided in the starting circuit for immediate braking of the motor.

6. A motor control circuit for electric motors comprising, a main winding, a phase winding, a pair of power lines, one of said power lines being connected to said windings, a plurality of capacitor means connected in series and with said phase winding and across said main winding, forming a starting circuit thereby to provide starting torque for the motor, means for connecting said main winding and the other of said power lines for operation of the motor, said last mentioned means being operable to disconnect said main winding from the other of said power lines and modify the relation of said plurality of capacitor means to each other and to said phase winding and connect at least a portion of said plurality of capacitor means and said phase winding across said main winding forming a closed braking loop having increased capacity and effecting a dynamic braking circuit for immediate braking of the motor thereby.

7. A motor control circuit comprising, a pair of power supply lines, a main winding, an auxiliary winding, said windings being connected to one of said supply lines, a plurality of capacitor means connected in series and with said auxiliary winding, said auxiliary winding and capacitor means being connected across said main winding to form a starting circuit, and switch means connected to said main winding and selectively to the other of said power supply lines for operation of the motor or to open the power line and engage in the line of said starting circuit to form a closed braking loop including said auxiliary winding and a reduced number of capacitor means across said main winding for immediate braking of the motor.

8. A motor control circuit comprising, a pair of power supply lines, a main winding, an auxiliary winding, said windings being connected to one of said supply lines, a plurality of capacitor means connected in series and with said auxiliary winding, said auxiliary winding and capacitor means being connected across said main winding to form a starting circuit and switch means connected to said main winding and selectively to the other side of said power supply lines for operation of the motor or to open the power line and engage in the line of said starting circuit to connect said capacitor means in parallel and with said auxiliary winding across said main winding to effect immediate braking of the motor.

References Cited in the file of this patent

UNITED STATES PATENTS

| | | |
|---|---|---|
| 2,380,270 | Suhr et al. | July 10, 1945 |
| 2,592,492 | Trant | Apr. 8, 1952 |
| 2,613,342 | Thompson et al. | Oct. 7, 1952 |